June 18, 1957 G. GAGGIOLI 2,795,882
HEAD OF FISHING SPEAR
Filed Jan. 26, 1955
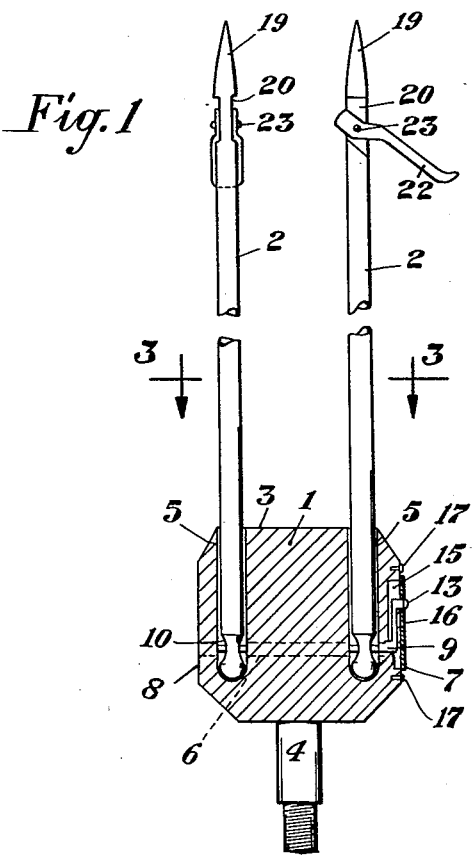
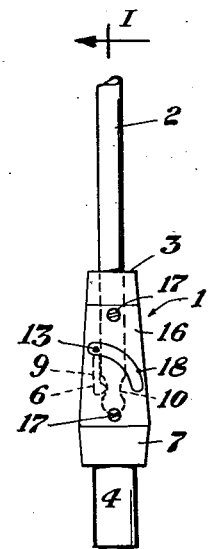
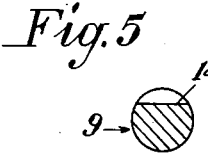
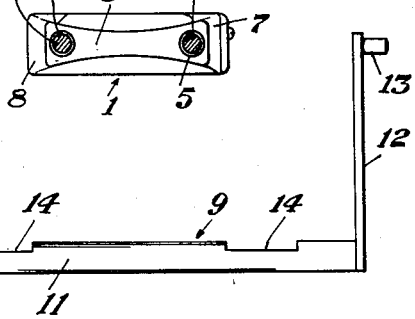
INVENTOR.
Guliano Gaggioli
BY _United States Patent Office_

2,795,882
Patented June 18, 1957

2,795,882

HEAD OF FISHING SPEAR

Giuliano Gaggioli, Rome, Italy

Application January 26, 1955, Serial No. 484,106

Claims priority, application Italy January 30, 1954

1 Claim. (Cl. 43—6)

My present invention relates to heads of fishing spear and more particularly concerns a head of fishing spear adapted for use in connection with subaqueous fishing guns.

It is well known that the subaqueous fishery, as practiced on more and more extensive scale in recent years, is effected by the use of aquatic glasses and a special fishing tool or gun apt to fling a metal arrow which is provided with a single barbed harpoon head or a multibarbed spear head. In some cases, the said barbs of the said fishing spear head comprise hinged fins capable to prevent to the pierced fish from escaping. The next procedure for disengaging the pierced fish from the points of the spear head is very tedious, especially when the said disengagement has to be effected by the subaqueous fisher in the water. In order to facilitate the said operation, a fishing harpoon head provided with a single barbed point screwed on one end of the metal arrow has been proposed. With regard to the fishing spear heads provided with two or more barbed points, however, the only solution offered for this problem was to give up the provision of the above mentioned hinged fins near the tips of the said points and to employ the usual stationary barbs which do not assure a positive engagement on the fish.

An object of my invention is to provide a fishing spear head integral with, or connected to, the metal arrow for subaqueous gun, the said fishing spear head being provided with a plurality of metal points or needles, capable of being substituted by other similar needles when a quick reutilization of the said subaqueous gun is required after the capture of a fish.

Another object of my invention is to provide a fishing spear head which comprises a metal block integral with, or connected to, the leading end of a usual metal arrow for subaqueous fishing gun, a plurality of metal points or needles provided with hinged fins and partially fitted within apertures drilled in the said metal block, and locking means apt to retain the said metal points or needles into the said apertures, the said locking means being capable to be easily operated by the subaqueous fisher so as to disengage the said metal points or needles from the said apertures after the capture of a fish by the said fishing spear.

In order that my invention may be better understood, I will now proceed to describe the same with reference to the accompanying drawing, wherein:

Figure 1 is a cross-sectional view showing a two-needle fishing spear head, taken substantially on the line I—I of Figure 2;

Figure 2 is a fragmentary side view of the spear head shown in Figure 1 with a part of the spear omitted;

Figure 3 is a sectional view through the device of Figure 1 taken substantially on line 3—3 of Figure 1;

Figure 4 is an enlarged front view showing a locking member which forms a constitutive part of the fishing spear head illustrated on the preceding figures; and Figure 5 is a cross-sectional view taken on the line V—V of Figure 4.

The fishing spear head shown in Figures 1, 2 and 3, particularly adapted for use with spring guns for subaqueous fishery, is substantially formed by a metal body or block 1 and two or more needles 2, removably fitted in the said metal block. The leading edge 3 of the said metal block is conveniently tapered in order to reduce to a minimum the frictional resistance of the water on the fishing spear. From the rear edge and coaxially to the center line of the said metal block, a partially threaded pin projects which can be screwed into a correspondingly threaded hole in the leading end of a usual metal arrow (not shown) for subaqueous fishing gun.

According to the specific embodiment shown in the annexed drawing, the metal block 1 is provided with two smooth cylindrical cavities 5 opened at the leading edge 3 of the said metal block and drilled symmetrically to the axis of the threaded pin 4. A cross hole 6, opened at the opposite side faces 7 and 8 of the metal block, is drilled transversely to the said cylindrical cavities 5. The said cylindrical cavities are apt to freely receive the rear ends of the spear needles 2, whereas the cross hole 6 is apt to receive a turnable locking key 9, a specific form of which is illustrated in Figures 4 and 5.

Near the rear or no-pointed end, each of the metal needles 2 of the fishing spear head is provided with a locking step or like, e. g. obtained by means of a peripheral groove 10. Moreover, the locking key 9 comprises a cylindrical rod 11 driven into the cross hole 6 and carrying, at one of its ends, a lever 12 provided with a knurled projection 13. By suitably acting by a finger end on the said knurled projection, the said cylindrical rod 11 can be rotated in either direction about its longitudinal axis. The said cylindrical rod is provided with two slots 14 matching with the two cylindrical cavities 5 when the locking member is driven fully in the cross hole 6, the said slots 14 being also apt to wholly open or free the said cylindrical cavities 5 at a predetermined angular position of the lever 12. At another angular position, e. g. at 90° from the first mentioned position, the said cylindrical cavities 5 are partially obstructed by the cylindrical surface of the cross rod 11; if the said partial obstruction is effected when the metal needles 2 are fully driven in the cylindrical cavities 5, the said cylindrical surface will lock positively the said metal needles by engaging their peripheral groove 10. The concurrent disengagement of the two needles 2 is obtained in a very simple manner by the partial rotation of the slotted rod 11, e. g. by acting on the knurled projection 13 by a finger end, the said partial rotation being adapted to match the slots 14 with the cylindrical cavities 5 and consequently with the peripheral grooves 10 of the said needles 2.

In order to prevent both the longitudinal sliding of the slotted rod 11 within the cross hole 6 and the occasional actuation of the lever 12, I have provided the arrangement shown in Figure 1. According to the said arrangement, the side surface 7 or 8 of the metal block 1 is provided with a shallow recess 15 covered by a plate 16 which is fixedly retained e. g. by screws 17. The lever 12 can only be displaced angularly into the space between the said covering plate 16 and the bottom of the shallow recess 15 and the said angular displacements can only be obtained by voluntary action, on the knurled projection 13, which projects shortly through a segmental slot 18 (see Figure 2) in the said covering plate 16.

Another characteristic feature of the fishing spear head according to my invention is that each needle 2 is provided, near its sharped-pointed end 19, with a pair of diametrically opposed notches 20, the depth of which approximately corresponds to the thickness of two forked arms 21 projecting from one end of a swinging fin 22 hinged by a pivot 23. The placement of the said forked arms into the said notches 20 is a noticeable improvement to the stream-lined form of the needles for fishing spear heads.

It will be obvious that my invention is susceptible of some changes and modifications without departing from the principles and spirit thereof. More particularly, the number of metal needles carried in a removable manner by the metal block 1 can be different from two. The locking device for retaining the said needles into the parallel cavities 5 may be different from that described hereinabove with reference to the annexed drawing. The present invention, moreover, relates to the metal needles 2, as manufactured and sold separately from the remainder of the fishing spear head. For this reason I do not wish to be understood as limiting myself to the precise arrangement and formation of the several parts herein shown in carrying out my invention in practice except as hereinafter claimed.

What I claim is:

A head for a fishing spear comprising a metal body adapted for connection to a spear shaft, said body having a plurality of substantially parallel cavities therein opening at the leading surface of the body and a lateral bore partially intercepting all of said cavities, barbed needles extending for portions of their lengths into said cavities and each having an annular recess formed therein registering with said lateral bore when said portions of the needle are received in the related cavities, a generally cylindrical rod rotatably mounted in said lateral bore and having notches in portions of the circumference thereof at locations along the rod registering with said cavities, a radial lever arm at one end of said rod, said body having a recess in the side thereof adjacent said one end of the rod and in which said lever arm is angularly movable through at least 90 degrees, a cover plate secured to said side of the body over said recess and having an arcuate slot therein concentric with the axis of rotation of said rod, and a knob extending from the free end of said lever arm through said slot to be grasped for effecting angular displacement of said lever arm and rod, said slot being dimensioned so that, with the knob against one end of the slot, said notches of the rod open into the related cavities to leave the latter unobstructed for the free insertion and removal of needles in the cavities, and, with the knob against the opposite end of said slot, the periphery of said rod reaches into said cavities and there engages in said annular recesses of the needle to hold the latter in the related cavities.

References Cited in the file of this patent

UNITED STATES PATENTS

| | | |
|---|---|---|
| 172,312 | Hedges | Jan. 18, 1876 |
| 1,475,257 | Bottone | Nov. 27, 1923 |
| 2,659,273 | Trautmann | Nov. 17, 1953 |
| 2,690,925 | Reis | Oct. 5, 1954 |

FOREIGN PATENTS

| | | |
|---|---|---|
| 411,732 | Italy | June 9, 1945 |
| 474,484 | Italy | Sept. 24, 1952 |